(12) United States Patent
Zlokarnik et al.

(10) Patent No.: US 7,797,157 B2
(45) Date of Patent: Sep. 14, 2010

(54) AUTOMATIC SPEECH RECOGNITION CHANNEL NORMALIZATION BASED ON MEASURED STATISTICS FROM INITIAL PORTIONS OF SPEECH UTTERANCES

(75) Inventors: Igor Zlokarnik, Natick, MA (US);
Laurence S. Gillick, Newton, MA (US);
Jordan Cohen, Gloucester, MA (US)

(73) Assignee: Voice Signal Technologies, Inc., Woburn, MA (US)

( * ) Notice: Subject to any disclaimer, the term of this patent is extended or adjusted under 35 U.S.C. 154(b) by 749 days.

(21) Appl. No.: 11/032,415

(22) Filed: Jan. 10, 2005

(65) Prior Publication Data
US 2005/0182621 A1 Aug. 18, 2005

Related U.S. Application Data

(60) Provisional application No. 60/535,863, filed on Jan. 12, 2004.

(51) Int. Cl.
*G10L 19/14* (2006.01)
*G10L 21/02* (2006.01)
*G10L 15/00* (2006.01)

(52) U.S. Cl. .................. 704/234; 704/224; 704/226; 704/227; 704/228; 704/231; 704/236

(58) Field of Classification Search ............ 704/234, 704/224, 231, 246
See application file for complete search history.

(56) References Cited

U.S. PATENT DOCUMENTS

| | | | | |
|---|---|---|---|---|
| 5,604,839 A | * | 2/1997 | Acero et al. ............... | 704/234 |
| 5,677,990 A | * | 10/1997 | Junqua .................... | 704/255 |
| 5,712,956 A | * | 1/1998 | Yamada et al. ............. | 704/234 |
| 6,173,258 B1 | * | 1/2001 | Menendez-Pidal et al. .. | 704/233 |
| 6,202,047 B1 | * | 3/2001 | Ephraim et al. ........... | 704/256.6 |
| 6,275,795 B1 | * | 8/2001 | Tzirkel-Hancock .......... | 704/214 |
| 6,502,070 B1 | * | 12/2002 | Boies et al. ................. | 704/224 |
| 6,633,842 B1 | * | 10/2003 | Gong ........................ | 704/233 |
| 6,658,385 B1 | * | 12/2003 | Gong et al. ................. | 704/244 |
| 7,035,797 B2 | * | 4/2006 | Iso-Sipila ................... | 704/227 |
| 7,062,433 B2 | * | 6/2006 | Gong ........................ | 704/226 |
| 7,117,148 B2 | * | 10/2006 | Droppo et al. ............. | 704/228 |
| 7,197,456 B2 | * | 3/2007 | Haverinen et al. ........... | 704/233 |

(Continued)

OTHER PUBLICATIONS

Yoshizawa, S.; Hayasaka, N.; Wada, N.; Miyanaga, Y., "Cepstral gain normalization for noise robust speech recognition," Acoustics, Speech, and Signal Processing, 2004. Proceedings. (ICASSP '04). IEEE International Conference on , vol. 1, No., pp. I-201-I-212 vol. 1, May 17-21, 2004.*

(Continued)

*Primary Examiner*—David R Hudspeth
*Assistant Examiner*—Paras Shah
(74) *Attorney, Agent, or Firm*—Chapin IP Law, LLC

(57) ABSTRACT

Channel normalization for automatic speech recognition is provided. Statistics are measured from an initial portion of a speech utterance. Feature normalization parameters are estimated based on the measured statistics and a statistically derived mapping relating measured statistics and feature normalization parameters. In some examples, the measured statistics comprise measures of an energy from the initial portion of the speech utterance. In some examples, measures of the energy comprise extreme values of the energy.

23 Claims, 1 Drawing Sheet

U.S. PATENT DOCUMENTS 7,283,879 B2 * 10/2007 Zeevi et al. ............ 700/94
7,292,974 B2 * 11/2007 Kemp ............... 704/234

OTHER PUBLICATIONS

Viikki O, Bye D. and Laurila K., A Recursive FeatureVector Normalization Approach for Robust SpeechRecognition in Noise, Proceeding of ICASSP 1998.*

C. Benitez, L. Burget, B. Chen, S. Dupont, H. Garundadri, H. Hermanski, P. Jain, S. Kajarekar and S.Sivadas. Robust ASR front-end using spectral based and discriminant features: experiments on the Auroratasks. Proc. of EuroSpeech-2001, pp. 429-432, Sep. 2001.* de Veth, et al., "Comparison of channel normalisation techniques for automatic speech recognition over the phone", Proceedings ICSLP, pp. 2332-2335, 1996.

Haeb-Umbach, et al., "Improvements in connected digit recognition using linear discriminant analysis and mixture densities", Proceedings ICASSP, pp. 239-242, vol. 2, 1993.

Haekkinen et al., "Improved feature vector normalization for noise robust connected speech recognition", Proceedings Eurospeech, pp. 2833-2836, 1999.

Junqua, Jean-Claude, "Impact of the Unknown Communication Channel on Automatic Speech Recognition: A Review", Proceedings Eurospeech, pp. KN 29-KN 32, vol. 1, 1997.

Lieb et al., "Experiments with the Philips continuous ASR system on the AURORA noisy digits database", Proceedings Eurospeech, pp. 625-628, 2001.

Shinn-Cunningham, B., "Empirical and modeled acoustic transfer functions in a simple room: Effects of distance and direction", IEEE Workshop on Applications of Signal Processing to Audio and Acoustics, 2001.

* cited by examiner

AUTOMATIC SPEECH RECOGNITION CHANNEL NORMALIZATION BASED ON MEASURED STATISTICS FROM INITIAL PORTIONS OF SPEECH UTTERANCES

CROSS-REFERENCE TO RELATED APPLICATIONS

This application claims priority to U.S. Provisional Application Ser. No. 60/535,863, filed on Jan. 12, 2004.

BACKGROUND

The invention relates to channel normalization for automatic speech recognition.

The recognition performance (e.g., accuracy) of automatic speech recognition systems can be adversely affected by variability of the communication channel. Some causes of variability are due to the speaker (e.g., vocal tract geometry, glottal excitation), the transmission channel (e.g., the variable position and direction to the microphone, room acoustics, ambient noise), and the use of microphones with different characteristics. In order to reduce the influence of the communication channel on the recognition performance, numerous schemes have been proposed. One such technique normalizes the recognition feature vector of cepstral coefficients such that each feature dimension feature[i] has zero mean and unit variance with respect to time t. This technique is typically applied using K cepstral coefficients (or mel-frequency cepstral coefficients) cepstrum[i] and their first and second order derivatives ($\Delta$cepstrum[i] and $\Delta\Delta$cepstrum[i]) to calculate normalized recognition features:

$$\text{feature}[i]=(cep[i]-\mu[i])/\sigma[i] \text{ for } 0\leq i<3K$$

with:

$$cep[i]=\text{cepstrum}[i]$$

$$cep[i+K]=\Delta\text{cepstrum}[i] \text{ for } 0\leq i<K$$

$$cep[i+2K]=\Delta\Delta\text{cepstum}[i]$$

where $\mu[i]$ is the mean of cep[i] with respect to time t, and $\sigma^2[i]$ is the variance of cep[i] with respect to time t.

The cepstral mean normalization (i.e., subtraction of $\mu[i]$) allows the removal of a stationary and linear, though unknown, channel transfer function. The cepstral variance normalization (i.e., division by $\sigma[i]$) helps to compensate for the reduction of the variance of the cepstral coefficients due to additive noise.

The amount of time over which to base the estimation of the channel characteristics can affect the performance of the speech recognizer. If the time window is chosen too long, the channel may not be considered stationary anymore. If the time window is chosen too short, the particular phonetic content of the speech segment can bias the estimation of the channel characteristics. As a compromise, many recognition systems estimate the channel based on a complete utterance of speech. Dependent upon the processing speed of the recognition system, this utterance-based normalization can lead to undesirable system delays since processing of the utterance does not start until the utterance has ended. Time-synchronous (or online processing) schemes typically utilize some type of recursive realization of the channel normalization, in which the long-term estimates for the mean and variance of the cepstral features are incrementally updated in time t, every $\tau$=10-20 msec:

$$\mu[i,t]=\alpha\mu[i,t-\tau]+(1-\alpha)cep[i,t]$$

$$\sigma^2[i,t]=\alpha\sigma^2[i,t]+(1-\alpha)(cep[i,t]-\mu[i,t])^2$$

Non-speech segments represent another complicating factor during channel estimation. Since the transmission channel separates the speaker from the microphone, the effect of the transmission channel only becomes auditorily apparent during speech segments. Consequently, a variable ratio of non-speech segments to speech segments will have a profound effect upon the estimated channel characteristics. However, trying to use a fixed ratio is limited by the uncertainties involved in differentiating between speech and non-speech segments.

SUMMARY

In one aspect, in general, the invention features a method and corresponding software and a system for processing data. The method includes measuring statistics from an initial portion of a speech utterance, and estimating feature normalization parameters based on the measured statistics and a statistically derived mapping relating measured statistics and feature normalization parameters.

Aspects of the invention can include one or more of the following features.

The measured statistics include measures of an energy from a portion of the speech utterance.

The measures of the energy include extreme values of the energy.

The method also includes accepting a plurality of utterances each associated with corresponding feature normalization parameters. Statistics are measured from a portion of each of the plurality of utterances, and the statistically derived mapping is formed based on the measured statistics and the feature normalization parameters corresponding to the plurality of utterances. The portion of each of the plurality of utterances may include an initial portion of each of the utterances, or an entire portion of each of the utterances.

Forming the statistically derived mapping includes forming a statistical regression.

The feature normalization parameters corresponding to the plurality of utterances include means and variances over time of the plurality of utterances.

Aspects of the invention can include one or more of the following advantages.

The amount of speech used to reliably estimate the characteristics of the communication channel is reduced. System delay associated with channel estimation and normalization is reduced. Explicit discrimination between speech and non-speech segments is not performed, improving robustness of automatic speech recognition to noisy speech.

Other features and advantages of the invention will become apparent from the following description, and from the claims.

DESCRIPTION

Figure 1:
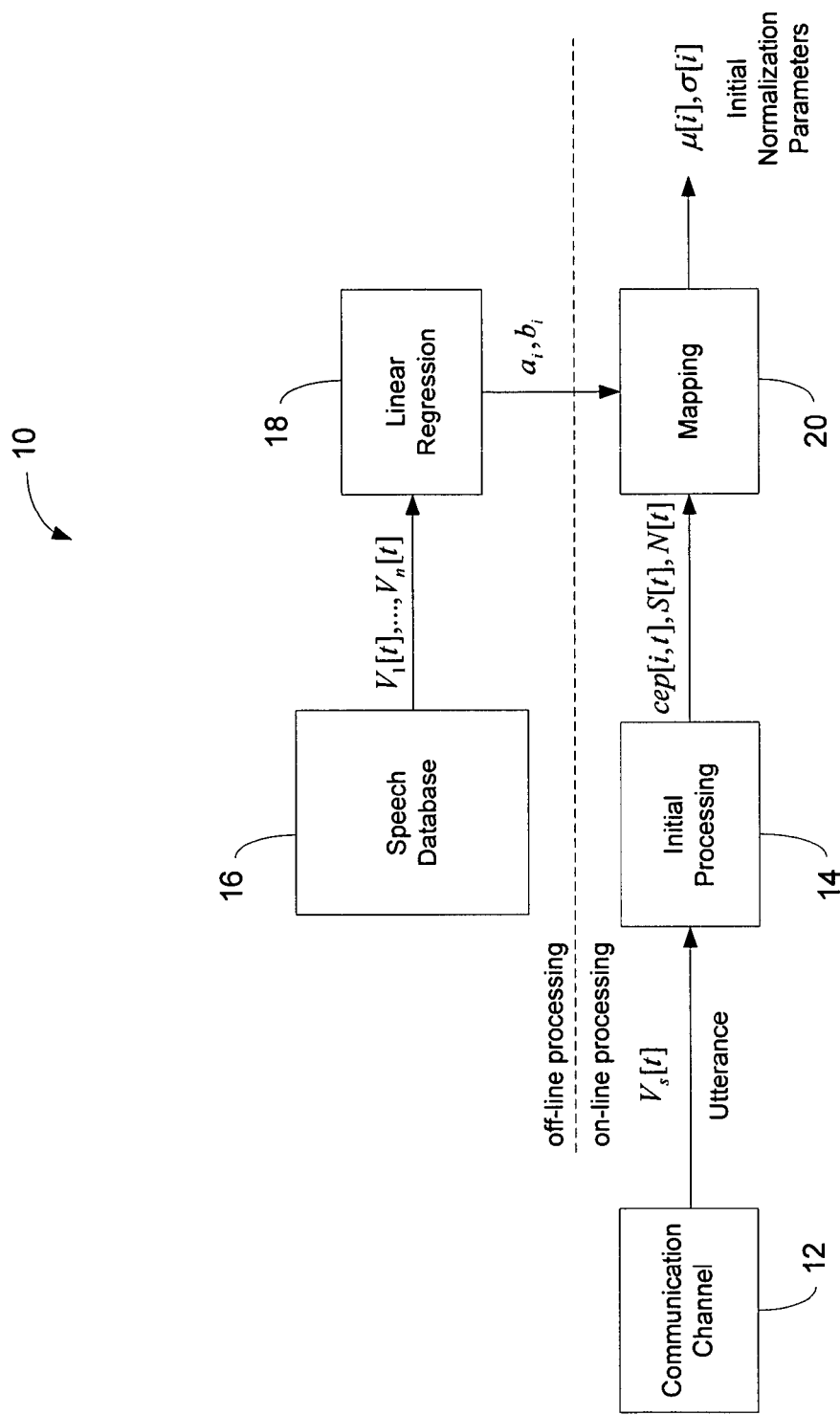
FIG. 1 is a block diagram of a processing system for automatic speech recognition channel normalization.

A processing system for automatic speech recognition channel normalization includes off-line processing and on-line processing to generate normalization parameters. The system is configured to take advantage of observations about the nature of a communication channel. For example, the following observations can be made about a speaker and portions of a communication channel including a room, a microphone, and ambient noise:

Long-term spectra of speakers can be primarily characterized by two parameters: an overall loudness and a spectral tilt that describes the overall slope of the spectrum. The spectral tilt is a direct result of the ratio between the time the glottis remains open versus closed during each pitch period. Although this ratio varies slightly between different speakers and their vocal effort (normal, shouting), the spectral tilt is typically −12 dB/octave. In the cepstral domain, the overall loudness is captured by the $0^{th}$ cepstral coefficient and the spectral tilt by the $1^{st}$ cepstral coefficient. All higher order cepstral coefficients are close to zero for a long-term spectrum due to its smooth shape in the frequency domain.

The transfer function of a room exhibits strong peaks and notches due to reverberations and echoes. In the cepstral domain, these frequency-to-frequency variations affect primarily coefficients of higher order than the ones used in speech recognition systems. Apart from these variations, the distance and direction between the speaker and the microphone impart primarily an overall attenuation in loudness, affecting primarily the $0^{th}$ order cepstral coefficient.

The microphone and audio circuitry typically impart some type of bandpass characteristics upon the audio signal. The corresponding frequency shape generally affects cepstral coefficients of all orders.

During speech segments, the ambient acoustic noise reduces the variance of cepstral coefficients of all orders. This reduction increases with decreasing signal-to-noise ratios.

A number of characteristics of the processing system are based on these observations:

A reliable estimation of μ[0] should preferably include at least some speech segments (e.g., speech frames, where a "frame" is a value of a cepstral coefficient cep[i,t] at a time t derived from values of a speech signal $V_s[t]$ over a finite window of time) due to its dependency upon the speaker's loudness and the speaker and/or microphone geometry. Higher-order coefficients of the channel mean μ depend primarily upon the microphone and audio circuitry, and thus can be estimated from frames that are not necessarily speech frames. The channel variances depend upon the signal-to-noise ratio. While the noise level can be estimated from non-speech frames alone, the estimation of the signal level should include at least some speech frames.

Referring to FIG. 1, a processing system 10 for automatic speech recognition channel normalization estimates the cepstral means and variances of a communication channel 12 via a mapping module 20 that uses a functional map that takes as input parameters from an initial processing module 14 that quickly converge based on few speech frames. In particular, the following linear map responds quickly to a speech onset while eliminating the need to explicitly detect the time of speech onset:

$\mu[i,t]=a_0(S[t]-N[t])+b_0+N[t]$ for i=0

$\mu[i,t]=\underline{cep}[i,t]$ for 0<i<K $\mu[i,t]=0$ for K≤i<3K $\sigma[i,t]=a_{i+1}(S[t]-N[t])+b_{i+1}$ for 0≤i<3K Here, $a_i$ and $b_i$ are weights of the functional map. S[t] and N[t] are estimates for the signal level and noise level, respectively. The cepstral coefficients $\underline{cep}[i,t]$ are averages of the cepstral coefficients cep[i,t] over time.

The initial processing module 14 estimates signal level and noise level online by tracking the extreme values of the frame energy cep[0] over time:

S[t]=max{cep[0,τ]} for 0≤τ≤t

N[t]=min{cep[0,τ]} for 0≤τ≤t

Alternatively, other ways of estimating S and N can be used, including the use of percentiles of cep[0, τ] (e.g., $80^{th}$ and $20^{th}$ percentiles of cep[0,τ], respectively).

The initial processing module 14 performs estimation of the average cepstral coefficients cep[i,t] online by averaging over all encountered frames:

$\underline{cep}[i,t]=\Sigma cep[i,\tau]/(t+1)$ over all 0≤τ≤t

Alternatively, a recursive scheme can be used.

The linear weights $a_i$, $b_i$ are determined during a prior off-line processing using a speech database 16 that contains utterances $V_1[t], \ldots, V_n[t]$ of numerous speakers in different acoustic environments recorded with various audio equipment. Based on corresponding pairs of "input patterns" and "output patterns" of the mapping module 20, the weights are determined using a linear regression performed by a linear regression module 18. As "input patterns," the system 10 uses the signal and noise levels as attained after each utterance, where each utterance stands by itself. The system 10 measures these signal and noise levels based on a portion of each utterance (e.g., an initial portion of an utterance, or an entire utterance). As "output patterns," the system 10 uses the channel means and variances based on all speech frames of a given session using the standard formulas:

$\mu[i]=\Sigma cep[i,\tau]/(t+1)$ over all 0≤τ≤t $\sigma^2[i]=\Sigma(cep[i,\tau]-\mu[i])^2/(t+1)$ over all 0≤τ≤t where a session includes all utterances for which the communication channel 12 can be assumed stationary. The particular speech/silence discrimination used for this step is not critical since the linear weights only model global tendencies of the data.

The channel estimation scheme used by the system 10 performs well even with few speech frames because it primarily relies on the estimation of two characteristics of the audio signal: its minimum and maximum energy. Values close to the final minimum energy are typically encountered during the first couple of frames, i.e., before the utterance has even started. Values close to the final maximum energy are typically encountered within the first vowel spoken, regardless of its phonetic identity.

Before the utterance starts, the proposed channel estimation scheme will generally under-estimate the signal-to-noise ratio SNR=S−N. Therefore, more accurate results are achieved when the SNR estimate is floored to a value that represents the SNR of the noisiest acoustic environment the system 10 is expected to perform well in. Also, the introduction of a processing delay as small as 100-200 ms between the estimation of the SNR and the channel normalization will ensure that a rather mature channel estimate will be applied also to the few speech frames preceding the first vowel of the utterance.

An appendix includes a software implementation a normalization approach.

Other embodiments are within the scope of the following claims.

What is claimed is:

1. A computer-implemented method comprising:
   forming a statistically derived mapping based on measured statistics from speech utterances received during off-line processing and feature normalization parameters associated with the speech utterances, wherein each measured statistic is based on portion of a single speech utterance and each feature normalization parameter is based on multiple speech utterances, wherein the speech utterances received during off-line processing are received from a speech database that includes utterances of multiple speakers in multiple acoustic environments and wherein forming the statistically derived mapping comprises determining weights by statistical regression that relate the measured statistics from the speech utterances received during off-line processing to the associated feature normalization parameters;

measuring statistics of energy, from an initial portion of a speech utterance received during on-line processing, where the initial portion of the speech utterance includes a limited number of speech frames having cepstral features and estimated to comprise a minimum and maximum energy to provide estimates of signal and noise levels; and estimating feature normalization parameters for the speech utterance received during on-line processing based on the measured statistics of the initial portion of a speech utterance by linearly mapping the cepstral features and the signal and noise levels using the statistically derived mapping weights.

2. The method of claim 1 wherein forming the statistically derived mapping comprises:

accepting a plurality of utterances;

measuring statistics from a portion of each of the plurality of utterances; and forming the statistically derived mapping based on a relationship between inputs that each comprise measured statistics from a portion of a single one of the plurality of utterances and outputs that each comprise feature normalization parameters calculated from multiple ones of the plurality of utterances.

3. The method of claim 2 wherein the portion of each of the plurality of utterances comprises an initial portion of each of the utterances.

4. The method of claim 2 wherein the portion of each of the plurality of utterances comprises an entire portion of each of the utterances.

5. The method of claim 2 wherein the feature normalization parameters corresponding to the plurality of utterances comprise means and variances over time of the plurality of utterances.

6. The method of claim 1, wherein a first of the measures of the energy consists of a maximum of the energy over an interval of time, and a second of the measures of the energy consists of a minimum of the energy over the interval of time.

7. The method of claim 6, wherein the interval of time includes at least one speech frame before the utterance has started and includes at least one speech frame within the first vowel.

8. The method of claim 1, wherein the estimated number of speech frames is determined based on an occurrence of a first vowel spoken in the utterance.

9. The method of claim 1, wherein measuring statistics includes measuring from an initial portion including a period of silence having close to the minimum energy and a period of speech having close to the maximum energy.

10. The method of claim 1, further comprising delaying about 100 ms to about 200 ms between measuring a signal to noise ratio (SNR) and applying the normalization parameters to map the cepstral features and the signal and noise levels.

11. The method of claim 1, further comprising responding quickly to a speech onset and eliminating the need to explicitly detect the time of speech onset by determining minimum energy from the first couple of frames.

12. The method of claim 11, further comprising determining minimum energy before the speech utterance received during on-line processing has started.

13. The method of claim 1, wherein the statistically derived mapping is a linear map.

14. The method of claim 13, wherein a variance of a cepstral feature i at time t is calculated by $\sigma[i,t]=a_{i+1}(S[t]-N[t])+b_{+1}$;

where $a_i$ and $b_i$ are weights of the functional map and $S[t]$ and $N[t]$ are estimates for the signal level and noise level, respectively.

15. A non-transitory computer-readable medium having instructions stored thereon for processing data information, such that the instructions, when executed by a processing device, enable the processing device to perform the operations of:

forming a statistically derived mapping based on measured statistics from speech utterances comprising speech energy and noise and received during off-line processing and feature normalization parameters associated with the speech utterances, wherein each measured statistic is based on portion of a single speech utterance and each feature normalization parameter is based on multiple speech utterances, wherein the speech utterances received during off-line processing are received from a speech database that includes utterances of multiple speakers in multiple acoustic environments and wherein forming the statistically derived mapping comprises determining weights by statistical regression that relate the measured statistics from the speech utterances received during off-line processing to the associated feature normalization parameters;

measuring statistics of energy, from an initial portion of a speech utterance received during on-line processing, where the initial portion of the speech utterance includes a plurality of speech frames estimated to comprise a minimum and maximum energy in the speech utterance; and estimating feature normalization parameters for the speech utterance received during on-line processing based on the measured statistics of the initial portion and the statistically derived mapping weights.

16. The non-transitory computer-readable medium of claim 15 wherein the estimated number of speech frames is determined based on an occurrence of a first vowel spoken in the utterance.

17. The non-transitory computer-readable medium of claim 15 wherein forming the statistically derived mapping comprises:

accepting a plurality of utterances;

measuring statistics from a portion of each of the plurality of utterances; and forming the statistically derived mapping based on a relationship between inputs that each comprise measured statistics from a portion of a single of the plurality of utterances and outputs that each comprise feature normalization parameters calculated from multiple of the plurality of utterances.

18. The non-transitory computer-readable medium of claim 17 wherein the portion of each of the plurality of utterances comprises an initial portion of each of the utterances.

19. The non-transitory computer-readable medium of claim 17 wherein the portion of each of the plurality of utterances comprises an entire portion of each of the utterances.

20. A system comprising;
a processor and computer-readable medium associated with modules performing operations executed by the processor and further comprising:
   a regression module configured to perform the operations of forming a statistically derived mapping based on measured statistics from speech utterances received during off-line processing and feature normalization parameters associated with the speech utterances, wherein each measured statistic is based on portion of a single speech utterance and each feature normalization parameter is based on multiple speech utterances, wherein the speech utterances received during off-line processing are received from a speech database that includes utterances of multiple speakers in multiple acoustic environments and wherein forming the statistically derived mapping comprises determining weights by statistical regression that relate the measured statistics from the speech utterances received during off-line processing to the associated feature normalization parameters;
   an initial processing module configured to perform operations of measuring statistics of energy, from an initial portion of a speech utterance received during on-line processing, where the initial portion of the speech utterance includes a limited number of speech frames based on initial frames before an utterance and an occurrence of a first vowel spoken in the utterance and estimated to comprise a minimum and maximum energy, respectively; and
   a mapping module configured to perform operations of estimating feature normalization parameters for the speech utterance received during on-line processing based on the measured statistics of the initial portion and the statistically derived mapping weights.

21. The system of claim 20
wherein the regression module is configured
   to accept a plurality of utterances;
   measure statistics from a portion of each of the plurality of utterances; and
   form the statistically derived mapping based on a relationship between inputs that each comprise measured statistics from a portion of a single of the plurality of utterances and outputs that each comprise feature normalization parameters calculated from multiple of the plurality of utterances.

22. The system of claim 21 wherein the portion of each of the plurality of utterances comprises an initial portion of each of the utterances.

23. The system of claim 21 wherein the portion of each of the plurality of utterances comprises an entire portion of each of the utterances.

\* \* \* \* \*